United States Patent

[11] 3,634,193

[72] Inventors: Yoshio Nakao
Ibaraki;
Mitsuzo Kuno, Suita; Einosuke Ohmura,
Nishinomiya, all of Japan
[21] Appl. No.: 556,271
[22] Filed: June 9, 1966
[45] Patented: Jan. 11, 1972
[73] Assignee: Takeda Chemical Industries, Ltd.
Osaka, Japan
[32] Priority: June 10, 1965
[33] Japan
[31] 40/345550

[54] METHOD FOR THE PRODUCTION OF INOSINE AND 5'-INOSINIC ACID
12 Claims, No Drawings

[52] U.S. Cl. .................................................. 195/28 N, 195/100

[51] Int. Cl. .................................................. C12d 13/06
[50] Field of Search ...................................... 195/28 N

[56] References Cited
UNITED STATES PATENTS
3,152,966  10/1964  Kinoshita et al. ............  195/28 N Primary Examiner—Alvin E. Tanenholtz
Attorney—Wenderoth, Lind & Ponack ABSTRACT: Inosine, 5'-inosinic acid, or a mixture thereof is produced by inoculating a mutant induced from *Corynebacterium simplex* Jensen, said mutant being an adenine-requiring mutant, onto a culture medium comprising a carbon source that is mainly hydrocarbons and adenine.

METHOD FOR THE PRODUCTION OF INOSINE AND 5'-INOSINIC ACID

This invention relates to a method for the production of inosine and 5'-inosinic acid (hereinafter referred to as 5'-IMP). More particularly, this invention relates to a method for the production of inosine, 5'-IMP or a mixture thereof, which comprises inoculating a mutant induced from *Corynebacterium simplex* Jensen, said mutant requiring at least adenine, onto a culture medium wherein the carbon source consists mainly of hydrocarbons containing not less than 10 percent (volume/volume) of normal paraffins having a carbon atom number from 14 to 21, the culture medium also containing adenine and other nutrients necessary for growth of the mutant, incubating the culture medium until desired substance(s) is accumulated therein, and recovering the desired substance(s) from the culture medium.

In hitherto-known processes for producing inosine and/or 5'-IMP by incubating micro-organisms, carbohydrates such as glucose, molasses, and starch hydrolyzate have been employed as carbon sources. These hitherto-known methods, however, are not industrially feasible precisely because they require these relatively expensive carbohydrates. Therefore, it has long been an art desideratum to provide, for use in the fermentative production of inosine and 5'-IMP, a less expensive carbon source than the known carbon sources.

The present invention, which fulfills the said desideratum and thus provides a useful method for producing inosine and 5'-IMP on an industrial scale is based on the following new findings.

Certain mutants induced from strains of *Corynebacterium simplex* Jensen which require at least adenine for their growth, even when their parent strains require no adenine for growth, can produce inosine and/or 5'-IMP in a rather large amount, when incubated in a culture medium wherein the carbon source consists mainly of hydrocarbons containing normal paraffins of any carbon atom number within the range from 14 to 21, which are readily available at relatively low cost, in the presence of adenine and other nutrients required for their growth.

Further, the mutants cannot grow on a minimal culture medium on which their parent strains can grow, but they grow on a culture medium prepared by the addition to the minimal culture medium of solely adenine source or of (1) an adenine source and (2) an amino acid source such as vitamin-free casein hydrolyzate and/or vitamin source containing water-soluble vitamins such as vitamin $B_1$, $B_2$, $B_6$, $B_{12}$, nicotinic acid amide, folic acid, and nicotinic acid, and therefore the mutants, requiring at least adenine for their growth, are adenine-sole requiring mutants, adenine- and amino acid-double requiring mutants, adenine- and vitamins-double requiring mutants, or adenine-, amino acid- and vitamins-triple requiring mutants. (Hereinafter the several above-mentioned mutants requiring at least adenine are simply referred to as "the mutant of this invention.")

The mutation can be effected by a conventional technique such as irradiation with ultraviolet light or X-ray, or by treatment with mutagen such as nitrogen mustard, nitrous acid, etc.

Spontaneously induced mutants from a micro-organism belonging to *Corynebacterium simplex* Jensen, which mutants have the above-mentioned properties, are also included in the category of "the mutant(s) of this invention."

In carrying out the method of this invention, it is generally preferable to employ a liquid culture medium and the incubation is carried out aerobically, i.e., with aeration, under static or submerged conditions. The culture medium employed in this invention is required to contain at least adenine and, as carbon source, hydrocarbons containing normal paraffins of a carbon atom number within the range of 14 to 21.

The amount of the normal paraffins of carbon atom numbers within the range of 14 to 21 contained in the hydrocarbons is not less than 10 volume per cent of the latter, from the viewpoint of both the growth of the mutant and yields of the objective substances. The said normal paraffins themselves are advantageously employed as 100 percent of the hydrocarbon source of the present invention.

The normal paraffins may be either those which consist of only one kind of normal paraffin of a carbon atom number within the range of 14 to 21 or those which consist of two or more kinds of normal paraffins, each having a carbon atom number within the said range. The hydrocarbon source in the present invention may contain other hydrocarbons (e.g., branched paraffins, olefins, cyclic paraffins, aromatic hydrocarbons, normal paraffins of 1 to 13 or of not less than 22 carbon atoms, etc.) than the normal paraffins of carbon atom numbers within the range of 14 to 21, as long as the normal paraffins of carbon atom numbers within the range of 14 to 21 are included as a whole in an amount of not less than 10 percent (volume/volume).

As such hydrocarbons, there are preferably employed heavy paraffins which contain about 90 percent (volume/volume) of normal paraffins of carbon atom numbers within the range of 14 to 21 and having a boiling range from about 262° to about 349° C., heavy gas oil which contains about 17 percent of normal paraffins of carbon atom numbers within the range of 15 to 20 and has a boiling range from about 272° to about 386° C., and gas oil which contains about 14 percent of normal paraffins of carbon atom numbers within the range of 14 to 17 and has a boiling range from about 180° to about 350° C. From the viewpoints of both the growth of the mutant of this invention and the yield of the objective substances, the hydrocarbons are generally used in such an amount as to make the concentration in the culture medium of the normal paraffins of carbon atom numbers within the range of 14 to 21 as a whole about 3 to 20 percent (volume/volume).

As these hydrocarbons are scarcely soluble in water, the addition thereof to an aqueous culture medium is practically carried out under stirring or shaking to prepare a suspension containing very fine particles. If desired, a suspending agent, e.g., a surfactant of the type of polyoxyethylene sorbitan monostearate (commercially available as Tween–60) may be employed. These hydrocarbons are by themselves sufficient carbon sources but, if desired, commonly employable carbon sources such as carbohydrate (e.g., glucose) may be used together with the hydrocarbons.

The medium should contain at least adenine as well as the hydrocarbons as nutrients. More concretely, when adenine sole requiring mutants are used, it is sufficient to employ a culture medium containing adenine as the nutrient, and when adenine- and amino acid- or adenine- and vitamin-double requiring mutants are used, it is necessary to employ a culture medium containing both adenine and amino acid or both adenine and vitamin, and when adenine-, amino acid- and vitamin-triple requiring mutants are used, all three of adenine, amino acid and vitamin should be contained in the culture medium.

Suitable as the adenine source are adenine itself, a compound which contains adenine component in its molecule and is easily convertible into adenine, or a natural substance containing such a compound. For example, there may be employed adenine, adenosine, 3'-adenylic acid, 5'-adenylic acid, meat extracts, cornsteep liquor, polypeptone, and yeast extract.

As the amino acid source, there may be employed amino acid itself such as aspartic acid, lysine, threonine, valine, alanine, methionine, histidine, cystine, leucine, etc., peptide, or a natural substance containing the amino acid and/or peptide, such as casein hydrolyzate, meat extract, polypeptone and yeast extract.

As vitamin sources, there may be employed water-soluble vitamin itself as vitamin $B_1$, $B_2$, $B_6$, $B_{12}$, nicotinic acid, nicotinic acid amide, folic acid, pantothenic acid and biotin, a vitamin mixture containing said water-soluble vitamins, or a natural substance containing said vitamins such as yeast extract, polypeptone, etc.

Natural substances containing an adenine source as well as an amino acid source and a vitamin source, e.g., soybean meal, meat extract, yeast extract, polypeptone, etc. may often be employed.

The culture medium desirably contains nitrogen source(s). As the nitrogen source(s), any of those used in the hitherto-known methods may be employed, and these may be exemplified by peptone, soybean powder, cornsteep liquor, meat extract, ammonium salts, organic or inorganic nitrogen compounds or nitrogen-containing materials. Furthermore, a small quantity of inorganic salts such as sodium chloride, salts of metals, e.g., zinc, iron, manganese, etc. may be added to the medium.

Incubation conditions such as the pH of the medium and the incubation temperature should be controlled so as to have the desired substances accumulated in the maximum amount.

Generally, the initial pH of the culture medium and the incubation temperature are respectively adjusted to about 4.0-9.0 and to about 20° to 40° C.

Under the above-mentioned culture conditions, inosine and/or 5'-IMP are produced and accumulated in the culture medium with the lapse of time.

Incubation is continued until the maximum amount of inosine and/or 5'-IMP are accumulated in the culture medium. Although the period required for the maximum accumulation of inosine and/or 5'-IMP is variable depending upon various factors, the amount of inosine and/or 5'-IMP in the culture medium generally reaches the maximum in about 2 to 7 days after the start of the incubation.

Inosine and/or 5'-IMP accumulated in the culture medium as recovered either in the free state or in the state of various salts such as disodium salt or dipotassium salt, by e.g., a treatment with activated charcoal or anion exchange resin.

From the foregoing description, it will be manifest that realization of the objective results of this invention, namely, development of an industrially feasible method for the manufacture of inosine and/or 5'-inosinic acid is circumscribed by several particularities:

a. the micro-organism employed must a mutant of *Corynebacterium simplex* Jensen;
b. the micro-organism must be an adenine-requiring mutant of the type requiring at least adenine for the growth thereof.
c. the culture medium must therefore contain adenine;
d. the culture medium must contain, as principal carbon source, at least one of the following hydrocarbons:
   n-tetradecane
   n-pentadecane
   n-hexadecane
   n-heptadecane
   n-octadecane
   n-nonadecane
   n-eicosane
   n-heneicosane
   i.e., a normal (unbranched or straight-chain) alkane with from 14 to 21 carbon atoms, as such or in admixture with each other or with other hydrocarbons; and
e. where the said n-alkane or n-alkanes is part of a mixture with other hydrocarbons, the said n-alkane portion must constitute not less than 10 percent by volume thereof.

Following examples are merely intended to illustrate presently preferred embodiments of this invention and not to restrict the scope of the latter.

Percentages throughout the specification, including also the examples, are volume/volume unless otherwise described. In these examples, parts by weight bear the same relation to parts by volume as do grams to milliliters.

EXAMPLE 1

An adenine-sole requiring mutant *Corynebacterium simplex* Jensen CN-38 (ATCC No. 19565) is inoculated in 20 parts by volume of the culture medium mentioned in the following table 1, and the medium is incubated under shaking at 28° C. for 40 hours.

TABLE 1

| gas oil* | 300 parts by weight |
|---|---|
| peptone | 5 parts by weight |
| yeast extract | 4 parts by weight |
| KH₂PO₄ | 2 parts by weight |
| K₂HPO₄ | 2 parts by weight |
| MgSO₄·H₂O | 0.5 parts by weight |
| distilled water | 1,000 parts by volume  pH 7.0 |

*having the following properties:

a. Components:
  normal paraffins of carbon atom numbers within the range of 14 to 17—13.5 percent,
  normal paraffins of carbon atom numbers within the range of 12 to 13—6.5 percent,
  branched paraffins—10 percent,
  monocyclic paraffins—25 percent,
  dicyclic paraffins—20 percent,
  monoaromatic hydrocarbons—12 percent,
  diaromatic hydrocarbons—8 percent.
b. Boiling range: 180° to 350° C.
c. Flash point: about 71° C.

The resultant culture broth in inoculated in 2,000 parts by volume of the culture medium of the same composition as mentioned above, and incubated under shaking at 28° C. for 96 hours, whereby 0.240 g./liter of inosine and 0.105 g./liter of 5'-IMP are accumulated in the culture broth. From the culture broth, 0.250 part by weight of inosine and 0.100 part by weight of 5'-IMP are recovered by adsorption on and elution from first activated carbon and then sulfonated polystyrene bead cation exchange resin (commercially available as Amberlite IR 120).

EXAMPLE 2

An adenine- and leucine- double requiring mutant *Corynebacterium simplex* Jensen CN-463 (ATCC No 19566) is inoculated in 2,000 parts by volume of the culture medium mentioned below as table 2, after the manner described in example 1, and the medium is incubated under shaking at 28° C. for 96 hours, whereby 0.410 gram/liter of inosine and 0.050 gram/liter of 5'-IMP are accumulated in the culture broth. From the culture broth, 0.520 part by weight of inosine and 0.060 part by weight of 5'-IMP are recovered by adsorption on and elution from first activated carbon and then sulfonated polystyrene bead cation exchange resin (commercially available as Amberlite IR 120).

TABLE 2

| heavy gas oil* | 200 parts by weight |
|---|---|
| casein hydrolyzate | 1 part by weight |
| yeast extract | 5 parts by weight |
| urea | 3 parts by weight |
| KH₂PO₄ | 2 parts by weight |
| K₂HPO₄ | 2 parts by weight |
| MgSO₄ | 0.5 parts by weight |
| distilled water | 1,000 parts by volume  pH 7.0 |

*having the following properties:

a. Containing 20 percent of normal paraffins of carbon atom numbers within the range of 15 to 20.
b. Boiling range: 272° to 380° C.
c. Flash point: about 140° C.
d. Specific gravity: 0.866

EXAMPLE 3

An adenine-sole requiring mutant *Corynebacterium simplex* Jensen CN-38 (ATCC No. 19565) is inoculated in 2,000 parts by volume of the culture medium mentioned below as table 3, after the manner described in example 1, and the medium is incubated under shaking at 28° C. for 96 hours, whereby 1.800 grams/liter of inosine is accumulated in the culture broth. From the culture broth, 2.4 parts by weight of inosine is recovered by adsorption on and elution from activated carbon.

TABLE 3

| | |
|---|---|
| heavy paraffins* | 100 parts by weight |
| cornsteep liquor | 5 parts by weight |
| yeast extract | 2 parts by weight |
| $KH_2PO_4$ | 2 parts by weight |
| $K_2HPO_4$ | 2 parts by weight |
| $MgSO_4 \cdot H_2O$ | 0.5 parts by weight |
| $FeSO_4 \cdot 7H_2O$ | 0.5 parts by weight |
| distilled water | 1,000 parts by volume pH 7.0 |

*having the following properties:

a. Components: normal paraffins of carbon atom numbers within the range of 14 to 21—90.7 percent, normal paraffins of carbon atom numbers within the range of 11 to 13—1.9 percent, and normal paraffins of carbon atom numbers within the range of 22 to 23—8.5 percent.

b. Boiling range: 262° to 349° C.

EXAMPLE 4

An adenine- and leucine-double requiring mutant *Corynebacterium simplex* Jensen CN–463 (ATCC No. 19565) is inoculated in 2,000 parts by volume of the culture medium mentioned below as table 4, after the manner described in example 1, and the medium is incubated under shaking at 28° C. for 96 hours, whereby 2.200 grams/liter of inosine is accumulated in the culture broth. From the culture broth 2.8 parts by weight of inosine are recovered by adsorption on and elution from activated carbon.

TABLE 4

| | |
|---|---|
| heavy paraffins* | 100 parts by weight |
| casein hydrolyzate | 1 part by weight |
| yeast extract | 20 parts by weight |
| $KH_2PO_4$ | 2 parts by weight |
| $K_2HPO_4$ | 2 parts by weight |
| $MgSO_4 \cdot H_2O$ | 0.5 parts by weight |
| $FeSO_4 \cdot H_2O$ | 0.2 parts by weight |
| distilled water | 1,000 parts by volume pH 7.0 |

*Same as in table 3.

Having thus disclosed the invention, what is claimed is:

1. A method for producing inosine, 5'-inosinic acid or a mixture thereof, which comprises inoculating a mutant induced from *Corynebacterium simplex* Jensen, said mutant being an adenine-requiring mutant, onto a culture medium comprising carbon source consisting mainly of hydrocarbons containing not less than 10 percent (volume/volume) of normal paraffins having a carbon atom number within the range from 14 to 21, and adenine, incubating the culture medium until the desired substance(s) is accumulated therein, and recovering the desired substance(s) from the culture medium.

2. A method according to claim 1, wherein the mutant is incubated at a temperature of about 20° to about 40° C. under aerobic conditions.

3. A method according to claim 2, wherein the culture medium contains about 3 to about 20 percent (volume/volume) of said normal paraffins.

4. A method according to claim 2, wherein the hydrocarbons are heavy paraffins which contain about 90 percent (volume/volume) of said normal paraffins and having a boiling range from about 262° to about 349° C.

5. A method according to claim 2, wherein the hydrocarbon is heavy gas oil which contains about 17 percent (volume/volume) of normal paraffins of carbon atom numbers within the range of 15 to 20 and has a boiling range from about 272° to about 386° C.

6. A method according to claim 2, wherein the hydrocarbon is gas oil which contains about 14 percent (volume/volume) of normal paraffins of carbon atom numbers within the range of 14 to 17 and has a boiling range from about 180° to about 350° C.

7. A method according to claim 2, wherein the mutant is an adenine-sole requiring mutant.

8. A method according to claim 2, wherein the mutant is an adenine- and amino acid-double requiring mutant.

9. A method according to claim 2, wherein the mutant is and adenine- and vitamins-double requiring mutant.

10. A method according to claim 2, wherein the mutant is an adenine-, amino acid- and vitamins-triple requiring mutant.

11. A method according to claim 7, wherein the mutant is *Corynebacterium simplex* Jensen CN–38 (ATCC No. 19565).

12. A method according to claim 8, wherein the mutant is *Corynebacterium simplex* Jensen CN–463 (ATCC No. 19566).

* * * * *